Figure 1:
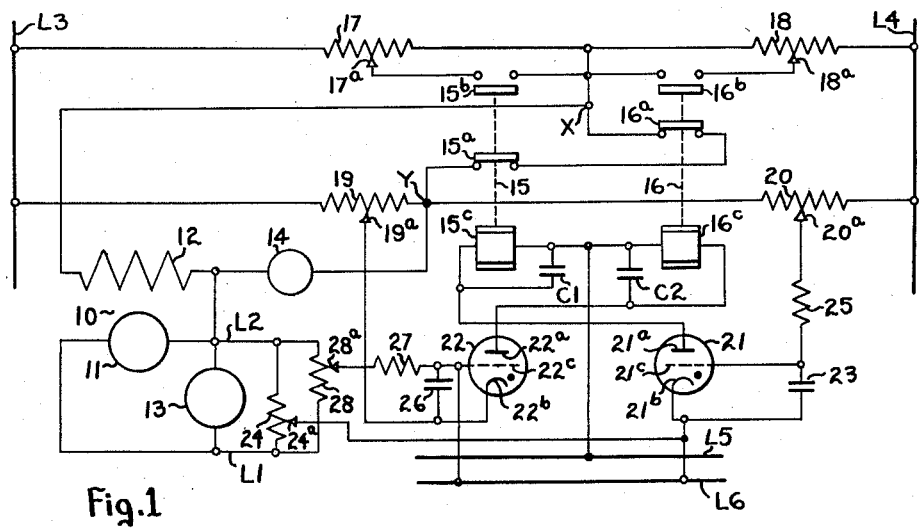

July 29, 1958          E. PELL          2,845,594

APPARATUS FOR REGULATING THE VOLTAGE OF ELECTRIC GENERATORS

Filed July 2, 1953          2 Sheets-Sheet 1

INVENTOR
ERIC PELL
BY
ATTORNEY

July 29, 1958  E. PELL  2,845,594
APPARATUS FOR REGULATING THE VOLTAGE OF ELECTRIC GENERATORS
Filed July 2, 1953  2 Sheets-Sheet 2
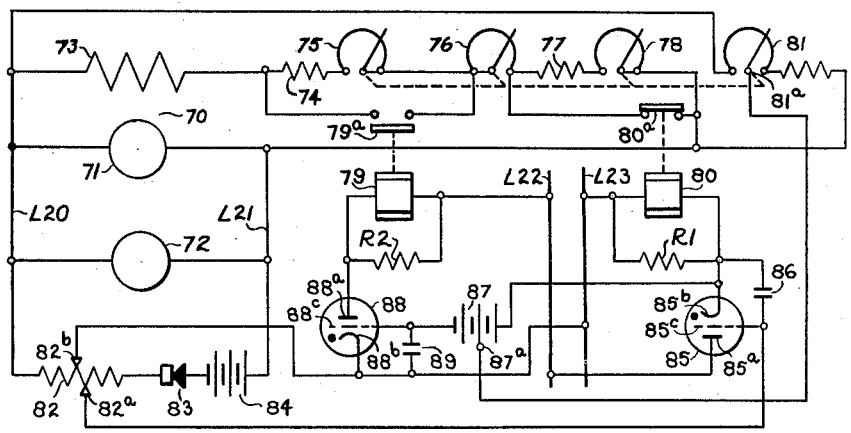
Fig. 4
Fig. 6
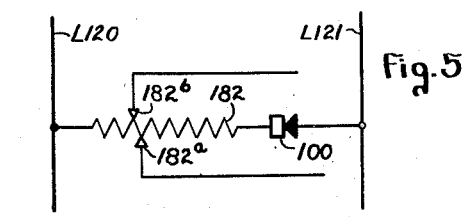
Fig. 5
INVENTOR
ERIC PELL
BY
ATTORNEY United States Patent Office 2,845,594
Patented July 29, 1958

2,845,594

APPARATUS FOR REGULATING THE VOLTAGE OF ELECTRIC GENERATORS

Eric Pell, Milwaukee, Wis., assignor to Cutler-Hammer, Inc., Milwaukee, Wis., a corporation of Delaware Application July 2, 1953, Serial No. 365,622

12 Claims. (Cl. 322—28)

This invention relates to methods of and apparatus for regulating the voltage of electric generators, particularly direct current generators.

A primary object of the invention is to provide improved voltage regulation methods and improved voltage regulation systems of the closed loop type.

The magnitude of the output voltage of a direct current generator is easily controlled by controlling the magnitude of the current flow in the field winding of the generator. However, because of hysteresis in its iron, a generator having a given output at a particular value of field current will provide a different output voltage when the field current, after having been changed, is again adjusted to said particular value. This voltage error is elastic in the sense that it tends to recur after corrective action is taken. A regulating system which provides corrective action in proportion to the magnitude of the error must continually provide such action to prevent recurrence of the error, and since the corrective action is proportional to the magnitude of the error, no corrective action can be effected unless steady state error exists.

Accordingly, while voltage errors resulting from other causes are also corrected, another object of this invention is to provide voltage regulation systems which correct elastic voltage errors resulting, for example, for generator hysteresis; and a further object is to provide such systems which afford a fixed corrective action without the need for a steady state error.

Other objects and advantages of the invention, such as a low ratio of manufacturing cost to effectiveness of the systems, will hereinafter appear.

The accompanying drawings illustrate certain embodiments of the invention which will now be described, it being understood that the embodiments shown are susceptible of various modifications without departing from the spirit of the invention or the scope of the appended claims.

Figure 2:
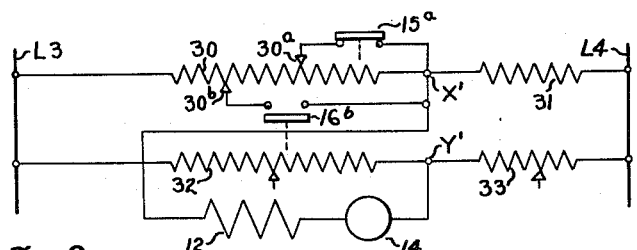
Figure 3:
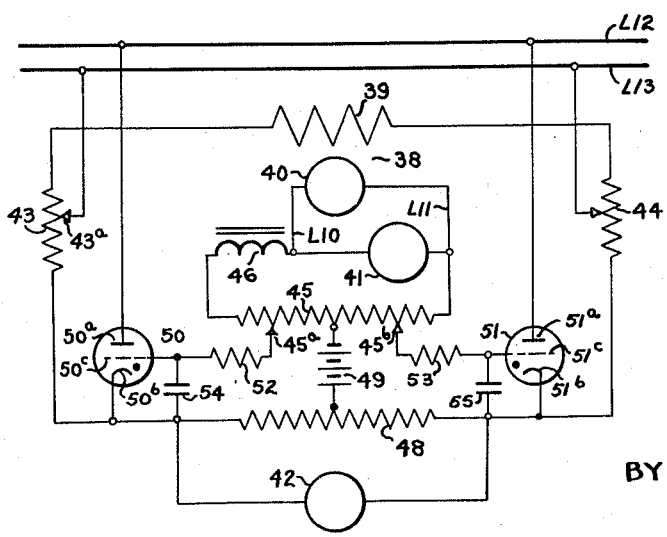

In the drawings,

Figure 1 diagrammatically illustrates a control system embodying the invention;

Fig. 2 illustrates diagrammatically a modification of the system illustrated in Fig. 1;

Fig. 3 diagrammatically illustrates another control system embodying the invention;

Fig. 4 diagrammatically illustrates another control system embodying the invention;

Fig. 5 illustrates diagrammatically a modification of the system shown in Fig. 4; and Fig. 6 illustrates diagrammatically, another control system embodying the invention.

Referring to Fig. 1, there is shown a direct current generator generally designated 10 and having an armature 11 and a field winding 12. The output power of the generator is supplied to any suitable load such as motor 13 through supply lines L1 and L2. The magnitude of the generator output voltage is determined by the degree of energization of field winding 12. The excitation of field winding 12 is supplied from some primary source such as a tachometer generator 14. For each value of voltage across the tachometer generator 14 the output voltage of the generator 10 has one proper, corresponding, value.

Field winding 12 and tachometer generator 14 are connected in series across points X and Y and comprise the center leg of a bridge circuit including resistor 17, 18, 19 and 20, and a source of unidirectional power such as supply lines L3 and L4. Resistors 17 and 19 are connected from line L3 to points X and Y, respectively; and resistors 18 and 20 are connected from line L4 to points X and Y, respectively. The bridge circuit is normally balanced so that points X and Y have the same electrical potential. Also connected in series circuit between points X and Y are the normally closed contacts 15a and 16a of relays 15 and 16, respectively. Normally open contacts 15b of relay 15 are connected from point X to a tap 17a on resistor 17, and normally open contacts of 16b of relay 16 are connected from point X to a tap 18a on resistor 18. As hereinafter more fully described, when contacts 15b are closed and contacts 15a are open the bridge circuit is electrically unbalanced, and the unbalance voltage is applied as a correction voltage across points X and Y. This voltage is applied to field winding 12 in series with the voltage of tachometer 14 and effects a decrease in the field winding excitation current. Conversely, when contacts 16a are opened and contacts 16b are closed, the bridge circuit is electrically unbalanced in such manner that a correction voltage which aids the tachometer voltage appears across points X and Y and increases the excitation current of field winding 12.

The signals for operation of relays 15 and 16 are provided by gas filled electron tubes 21 and 22, respectively. Anode 21a of tube 21 is connected through the parallel combination of the operating winding 15c of relay 15 and a capacitor C1 to line L5 of a pair of alternating current supply lines L5 and L6. The cathode 21b of said tube is connected to line L6 and is connected through a capacitor 23 to the control electrode 21c. Cathode 21b is further connected to the tap 24a of a resistor 24 which is connected across the lines L1 and L2. The control electrode 21c is connected through a resistor 25 to a tap 20a on resistor 20.

Tube 22 has its anode 22a connected through the parallel combination of a capacitor C2 and the operating winding 16c of relay 16 to line L5. Cathode 22b of tube 22 is connected to tap 19a of resistor 19, and the control electrode 22c is connected to line L6, and through a capacitor 26 to cathode 22b. Control electrode 22c is also connected through a resistor 27 to tap 28a of a resistor 28 which is connected across lines L1 and L2. Line L2 is connected to the generator field circuit between field winding 12 and tachometer generator 14 to complete the control electrode-cathode circuit for each of tubes 21 and 22. This circuit may be traced, for tube 21, from control electrode 21c, through resistor 25, through resistor 20 from tap 20a to point Y, through tachometer generator 14, and through resistor 24 from line L2 to tap 24a and thence to cathode 21b.

The total voltage applied between control electrode 21c and cathode 21b comprises, in series, a bias voltage developed across resistor 20 from tap 20a to point Y, a reference voltage which is the voltage developed across tachometer generator 14, and a feedback voltage which is that portion of the output voltage of generator 10 which appears between line L2 and tap 24a. These voltages have polarity and magnitude (because of the adjustment of taps 20a and 24a) so that the control electrode potential is held below the critical firing potential for tube 21.

If the magnitude of the output voltage of the generator 10 has a value which is some predetermined amount greater than the proper value corresponding to the voltage of tachometer 14, the critical firing potential of tube 21 is exceeded and it is fired. The anode current which flows through tube 21 and operating winding 15c energizes the latter sufficiently to effect closure of contacts 15b and opening of contacts 15a. A voltage of predetermined magnitude then appears across points X and Y. This voltage opposes the voltage of tachometer generator 14 and is of sufficient magnitude so that the excitation current of field winding 12 will be reduced by more than that amount required for correction of the generator output voltage. The voltage change across lines L1 and L2 will be effected at a rate determined by the time constant of the generator field circuit. When the generator output voltage has been corrected, the control electrode-cathode potential will fall below the critical firing value for the tube 21. The tube 21 will become non-conductive at the end of the next positive half cycle of the anode 21a supply potential. However the time constant of relay 15 and capacitor C1 is effective to delay actuation of the contacts for a short period. During this period the field current continues to decrease so that the magnetism of the generator iron is decreased below that value which causes an output voltage of proper magnitude to be generated. When contacts 15a and 15b are actuated, normal excitation current to field winding 12 will be restored. Thereafter, the magnetism of the generator iron will be increased, due to hysteresis, in such manner that after restoration of normal field current, the regulated generator output voltage is of proper magnitude.

The control electrode-cathode circuit of tube 22 may be traced from control electrode 22c through resistor 27, through resistor 28, from tap 28a to line L2, through tachometer 14 and thence through resistor 19 from point Y to tap 19a and cathode 22b. Bias for the tube 22 is provided by the voltage drop across resistor 19 from tap 19a to point Y. The voltage across tachometer 14 and the voltage across resistor 28a from line L2 to tap 28a are of opposite polarity and have magnitude with respect to one another and to the bias voltage so that the critical firing voltage of tube 22 normally is not exceeded. When, for example after a reference voltage change, the voltage appearing across lines L1 and L2 has a value some predetermined amount below the value which it should have for proper correspondence with the voltage of tachometer generator 14, tube 22 will fire and current will flow in operating winding 16c.

This causes contacts 16a and 16b to open and close, respectively, and a voltage of predetermined magnitude having polarity to aid the voltage of tachometer generator 14 to be applied across points X and Y. The excitation current of field winding 12 increases at a rate determined by the time constant of the field circuit. The magnetism of the generator iron is increased accordingly and in turn effects an increase in the voltage measured between lines L1 and L2. When the error in the latter voltage has been overcome, the control element voltage falls below the critical firing value for tube 22. Actuation of contacts 16a and 16b is delayed because of the time constant of operating winding 16c and capacitor C2. During this delay the field current continues to increase and overcorrects the magnetism of the generator iron. When the contacts are actuated and the field current returns to its normal value, such overcorrection in the magnetism of the iron is nullified by hysteresis. Normal field excitation current thereafter results in a generator output voltage of proper value. No steady state error is required.

The bridge circuit illustrated in Fig. 2 may be used instead of the bridge circuit comprising resistors 17, 18, 19 and 20 in Fig. 1. In this circuit resistors 30 and 31 are connected from point X' to lines L3 and L4, respectively, and resistors 32 and 33 are connected from point Y' to lines L3 and L4, respectively. Normally closed contacts 15a and normally open contacts 16b are connected from point X' to taps 30a and 30b, respectively, on resistor 30. The values of the resistors and the position of tap 30a are selected so that resistors 30 and 32 have a greater value of resistance than resistors 31 and 33, and so that while contact 15a is closed and contact 16b is open, no voltage from the source L3, L4 appears between points X' and Y'. When contact 15a is opened, the voltage between points X' and Y' aids the tachometer voltage. When contact 16b is closed the voltage between points X' and Y' opposes the tachometer voltage.

With this circuit arrangement the resistance of the generator field winding circuit remains substantially constant regardless of whether or not a corrective action is being applied. Thus correction voltages of lower magnitude may be employed. In addition, this scheme does not require the use of contacts 15b and/or 16a employed in the system of Fig. 1.

In the regulating system illustrated in Fig. 3, the generator 38 comprises a field winding 39 and an armature 40. The armature is connected to supply power through lines L10 and L11 to a motor 41. Excitation current for field winding 39 is supplied by a tachometer generator 42 in a series circuit comprising tachometer generator 42, a tapped resistor 43, said field winding 39, and a tapped resistor 44.

The output voltage of generator 38 is measured in a center tapped resistor 45 which is connected in series with an inductor 46 across lines L10 and L11 and is provided with taps 45a and 45b. The tachometer or reference voltage is measured in a center tapped resistor 48, which is connected across tachometer generator 42. The center taps of resistors 45 and 48 are bridged by a unidirectional voltage source 49.

This source 49 provides a bias voltage for a pair of gas-filled electron tubes 50 and 51. These tubes act both as amplifiers and as switches and respectively comprise anodes 50a and 51a, cathodes 50b and 51b, and control electrodes 50c and 51c. Anodes 50a and 51a are connected to line L12 of a pair of alternating current supply lines L12 and L13. Control electrodes 50c and 51c are connected through resistors 52 and 53, respectively, to taps 45a and 45b, respectively. Cathode 50b is connected to control electrode 50c through a capacitor 54 and to the connection between tachometer 42 and resistor 43. Cathode 51b is connected to control electrode 51c through a capacitor 55 and is also connected to the conductor extending between tachometer 42 and resistor 44.

That portion of the output voltage of generator 38 which is developed across resistor 45 from the center tap of said resistor to tap 45a; also the voltage of the bias source 49, and that portion of the tachometer voltage which is developed across resistor 48 between its center tap and cathode 50b, are applied in series between control electrode 50c and cathode 50b. The polarity of these voltages, the value of the bias voltage and the position of tap 45a are adjusted in such manner that tube 50 will not fire if the output voltage of generator 38 has a magnitude having predetermined correspondence with the voltage of tachometer 42 or has a higher magnitude. However, when, because of hysteresis or the like, the voltage of generator 38 has a value some predetermined amount below the value corresponding to the tachometer voltage, the critical firing voltage of tube 50 is exceeded. The tube 50 then fires and current flows from line L12 through the tube and through resistor 43 from cathode 50b to tap 43a and line L13. The resultant voltage drop from cathode 50b to tap 43a has polarity to aid the voltage of tachometer 42. The excitation current in field winding 39 will increase and, accordingly, the output voltage of generator 38 will increase.

Because of the inductance of inductor 46, the change in field current will lag the change in generator output voltage. Tube 50 will cease conducting when the voltage error has been overcome and the generator voltage as measured across resistor 45 is of proper value. However, when such measured generator output voltage reaches such proper value, the field current will have reached a value sufficient to overcome the residual magnetism of the generator iron.

In a similar manner, tube 51 will begin conducting when the generator voltage has a value some predetermined amount above that value corresponding to the tachometer voltage, and will cause a voltage opposing that of tachometer 42 to be applied, in series with the tachometer voltage, to the field winding 39.

Fig. 4 shows a generator 70 having an armature 71 connected to supply power through lines L20 and L21 to a suitable load such as motor 72. The generator is provided with a field winding 73 which is connected in shunt with armature 71 through the series circuit combination of a resistor 74, a rheostat 75, a rheostat 76, a resistor 77 and a rheostat 78. Thus the generator 70 is the primary source of excitation for its own field winding 73. Connected in shunt with resistor 74 and rheostat 75 is the normally open contact 79a of a relay 79. Connected in shunt with resistor 77 and rheostat 78 is the normally closed contact 80a of a relay 80.

A potentiometer 81 is also connected in shunt with armature 71. The movable arms of rheostats 75, 76 and 77 and arm or tap 81a of potentiometer 81 are simultaneously adjustable and are respectively connected so that as tap 81a is turned toward line L20, the resistance of rheostats 75 and 78 is decreased and the resistance of rheostat 76 is increased.

Connected in shunt with armature 71 across lines L20 and L21 is a series circuit comprising a resistor 82, a half-wave rectifier 83, and a source of unidirectional voltage such as battery 84. Resistor 82 is provided with taps 82a and 82b. Rectifier 83 is connected to be conductive in the direction from line L21 to L20. Battery 84 is connected to oppose the output voltage of the generator 70.

A gas-filled electron tube 85 comprising an anode 85a, a cathode 85b and a control electrode 85c, has its anode connected to line L22 of a pair of alternating current supply lines L22 and L23. Cathode 85b is connected to line L23 through the parallel combination of a resistor R1 and relay 80 and is connected through a capacitor 86 to control element 85c and tap 82a. In addition cathode 85b is connected to one side of a source of unidirectional voltage such as battery 87. This battery has an intermediate tap 87a connected to the arm 81a of potentiometer 81. The other end of battery 87 is connected to the control element 88c of a gas-filled electron tube 88 which has an anode 88a connected to line L22 through the parallel combination of a resistor R2 and relay 79. Tube 88 also has a cathode 88b which is connected to line L23 and tap 82b and which is also connected through a capacitor 89 to control element 88c.

For any given setting of the simultaneously movable arms of rheostats 75, 76 and 78 and of the arm of potentiometer 81, the output voltage of generator 70 which appears across lines L20 and L21 has one proper magnitude. By an action hereinafter more fully described, tube 88 will be rendered conductive to energize relay 79 and effect closure of contact 79a when the voltage across lines L20 and L21 has a magnitude some predetermined amount less than that value corresponding to a given setting of potentiometer 81. When contact 79a is closed, resistor 74 and rheostat 75 are short-circuited. Thus the resistance in series with the winding 73 is decreased, the excitation of winding 73 is therefore increased, and the output voltage of generator 70 is increased. When the latter voltage has reached its proper magnitude, tube 88 becomes non-conductive and after a time delay contact 79a opens to re-establish normal connection of the field winding circuit.

Tube 85 becomes conductive and energizes relay 80 to open contact 80a when the voltage between lines L20 and L21 is a predetermined amount greater than normal. Opening of these contacts removes the short-circuit around resistor 77 and rheostat 78 to effect an increase in the amount of resistance in circuit with winding 73 and accordingly to decrease the excitation of said winding 73.

Rectifier 83 is so connected as to prevent current flow from battery 84 but to permit current flow through resistor 82 from line L21 to L20. No current can flow in resistor 82, however, unless the voltage of generator 70 exceeds that of battery 84 since these voltages are connected in series opposition. Thus the voltage drop across resistor 82 has a magnitude approximately equal to the amount by which the voltage of generator 70 exceeds the voltage of battery 84. The reference voltage measured from arm 81a of potentiometer 81 to line L20 has a magnitude which is that percentage of the instantaneous voltage from line L20 to line L21 corresponding to the percentage of rotation of the arm 81a from line L20 to line L21.

As the generator voltage increases above the voltage of battery 84, the voltage drop across resistor 82 will increase more rapidly than will the voltage drop from tap 81a to line L20 for all settings of tap 81a. For any such setting there will be a predetermined generator voltage at which the voltage across resistor 82 equals the reference voltage measured from the tap 81a of potentiometer 81 to line L20. At generator voltages below this predetermined magnitude, the voltage of resistor 82 will be less than the voltage measured from tap 81a to line L20; and at generator voltages above the predetermined value, the voltage across resistor 82 will be greater. The voltage measured from tap 81a to line L20 and the voltage across resistor 82 from line L20 to tap 82b are connected in series opposition and together form an error signal voltage which is superimposed upon the bias voltage of battery 87. The error signal and bias voltages are applied between control element 88c and cathode 88b. The polarity of the voltage across resistor 82 is such that it tends to prevent tube 88 from firing.

The voltage of battery 87 is adjusted to just less than the critical firing voltage of tube 88. When the generator voltage is of proper magnitude, the voltage from tap 82b to line L20 cancels the voltage from tap 81a to line L20 so that the error signal voltage is zero, and the tube does not fire. If the generator voltage decreases below the proper value, the voltage between tap 82b and line L20 decreases at a faster rate than does the voltage from tap 81a to line L20. The result is to increase the error signal voltage in that direction of polarity which causes the critical firing voltage of the tube to be exceeded. The tube 88 then fires, relay 79 is energized and its contacts 79a are actuated to short-circuit resistor 74 and rheostat 75. Thus the excitation of winding 73 and the output voltage of generator 70 is increased at a rate determined by the time constant of the field circuit. Because of the time constant of relay 79 and resistor R2 the field current is increased above that value required to overcome the generator output voltage error before contacts 79a are opened. As a result, the residual magnetism of the generator iron is altered so that upon restoration of normal field current the output voltage has the proper magnitude.

The operation of tube 85 is similar to that of tube 88 except that the polarity of the voltage from tap 81a to line L20 and the voltage from line L20 to tap 81a are reversed with respect to control element 85c and cathode 85b of tube 85. Thus the tube 85 fires to energize relay 80 when the generator voltage exceeds its proper value by a predetermined amount.

An additional feature of the system illustrated in Fig. 4, is provided by the simultaneous adjustment of rheostats 75, 76 and 78 with potentiometer 81. This arrangement not only permits greater control over the normal field winding excitation, but it also develops correction voltages the magnitudes of which are variable with the magnitude of the normal field excitation.

Rectifier 83 and battery 84 may be replaced by other non-linear impedance means or semi-conductor means having unidirectional current conductivity characteristics. The only requirement is that the current which is permitted to flow in resistor 82 will have a value such that the slope of the variation of the voltage across resistor 82 with the generator voltage, differs from the slope of the curve representing the variation of the voltage from tap 81$^a$ of potentiometer 81 to line L20 with generator voltage and further that these curves intersect.

One such modification is shown in Fig. 5 in which resistor 182 and lines L120 and L121 correspond to resistor 82 and lines L20 and L21, respectively, of Fig. 4. A semi-conductor element or over-stacked rectifier 100 provides a non-linear impedance.

A system in which the reference voltage, the correction voltage and the bias voltage are derived from a single unidirectional source is illustrated in Fig. 6. The source is indicated by supply lines L14 and L15.

The system utilizes a compound rheostat similar in type to that described and claimed in my Patent No. 2,634,386, granted April 7, 1953, for Control System for Electric Motors, and assigned to the assignee of this application. This rheostat comprises sections 130$^a$, 130$^b$, 131, 132$^a$, 132$^b$ and 133, which are simultaneously adjustable. Sections 130$^a$ and 132$^a$ are connected in series from line L14 to line L15. The tap of section 130$^a$ is connected to the tap of section 130$^b$ and the tap of section 132$^a$ is connected to the center tap of section 132$^b$. The center tap of section 130$^b$ is connected to the center tap of section 132$^b$ through a series circuit including a resistance 134, the field winding 135 of a generator 136, and a resistor 137. The resistance values per unit of length of at least one of each pair of sections 130$^a$, 130$^b$ and 132$^a$, 132$^b$ are so arranged in tapered relationship that the resistance in circuit with field winding 135 is constant regardless of the setting of the simultaneously adjustable taps of these sections.

The connection between sections 130$^a$ and 132$^a$ is connected with the center tap of a resistor 140 which in turn is connected across the armature 141 of generator 136. Resistor 140 is provided, on opposite sides of its center tap, with taps 140$^a$ and 140$^b$.

Sections 131 and 133 are connected in series between lines L14 and L15. The tap of section 131 is connected to the control electrode 142$^c$ of a gas-filled electron tube 142. The cathode 142$^b$ of this tube is connected to tap 140$^a$ and, through a capacitor 143, to control electrode 142$^c$. Cathode 142$^b$ is further connected to line L16, of a pair of alternating current supply lines L16 and L17, through the parallel combination of a resistor R3 and the operating winding of a relay 144. This relay has normally open contacts 144$^a$ connected in shunt circuit with resistor 134. Anode 142$^a$ of the tube is connected to line L17.

The tap of section 133 is connected to the control electrode 148$^c$ of a gas-filled electron tube 148. The cathode 148$^b$ of this tube is connected to tap 140$^b$, and through a capacitor 149 to control electrode 148$^c$. Cathode 148$^b$ is further connected to line L16 through a parallel circuit consisting of a resistor R4 and the operating winding of a relay 150. This relay has normally closed contacts 150$^a$ connected in shunt circuit with resistor 137. Anode 148$^a$ of the tube is connected to line L17.

The reference and bias voltages for tube 142 are developed between the center tap of resistor 140 and the tap of section 131. The feed-back voltage applied to tube 142 is that portion of the output voltage of generator 136 which is measured across resistor 140 from the center tap thereof to tap 140$^a$. These voltages are applied in series between control electrode 142$^c$ and cathode 142$^b$. The bias voltage has a fixed magnitude, but the reference voltage is adjustable by operation of the compound rheostat 130$^a$, etc., aforementioned. For any given value of this reference voltage, the generator output voltage has a corresponding proper magnitude.

If the generator voltage, as measured between tap 140$^a$ and center tap of resistor 140, falls a predetermined amount below that proper value, the critical firing voltage of the tube 142 will be exceeded. The tube 142 will fire and its anode current will energize relay 144. Contacts 144$^a$ are thereupon caused to close and short-circuit resistor 134. This causes increased voltage to be applied across field winding 135. To the extent that it is increased, this voltage is a correction voltage. The magnitude of the increase depends on the adjustment of the taps of sections 130$^a$, 130$^b$ and 132$^a$, 132$^b$. The magnitude of the correction voltage is adjustable with the reference voltage and is more than sufficient to overcome the error in the output voltage of the generator 136.

Because of the time constant in the generator field circuit, the correction is accomplished gradually. After the correction is effected and after a time delay caused by the time constant of relay 144 and resistor R3, the relay will be deenergized and will open its contacts 144$^a$ to re-establish normal connection of the field winding circuit. The magnetic condition of the generator iron is thus altered so that thereafter normal field current results in a generator output voltage of proper value.

The operation of tube 149 and of relay 150 is analogous to that of tube 142 and relay 144. When the output voltage of the generator rises a predetermined amount above normal, contacts 150$^a$ are opened and the resistance of resistor 137 is included in the field circuit to effect a decrease in the excitation of field winding 135. Accordingly, the output voltage of generator 136 is decreased.

It will be readily apparent that other devices such, for example, as saturable reactors, and especially magnetic amplifiers, while requiring somewhat different connection in the circuits, may be used instead of electron tubes to provide voltage regulation by the same methods. Moreover, the time delay provided by inductor 46 in Fig. 3 and by the parallel combination of the relay operating winding and a resistor or capacitor as in the other figures, may be provided by other elements.

I claim:

1. In a voltage regulating system affording correction of residual magnetic errors in the output voltage v. field excitation characteristic of a direct current generator having a field winding for excitation thereof, the combination with means responsive at a preselected magnitude of error in the output voltage of the generator to apply to the field winding and maintain a corrective voltage of predetermined magnitude, the magnitude of such corrective voltage being greater than that required for correction of such error, of means terminating application of such corrective voltage upon the expiration of a selected period sufficient to insure restoration of a normal relationship between generator output voltage and field excitation as a result of hysteresis relaxation following termination of the application of such corrective voltage.

2. In a voltage regulating system affording correction of residual magnetic errors in the output voltage v. field excitation characteristic of a direct current generator having a field winding for excitation thereof, the combination with means responsive at a preselected magnitude of error in the output voltage of the generator to apply a corrective voltage of predetermined magnitude to the field winding, the magnitude of such corrective voltage being greater than that required for correction of such error, of means including a time delay element prolonging application of such corrective voltage beyond the time when the error in the output voltage is overcome and terminating application of such corrective voltage upon the expiration of a selected period after such error is overcome.

3. In a voltage regulating system affording correction of residual magnetic errors in the output voltage v. field excitation characteristic of a direct current generator having a field winding for excitation thereof, the combination with means responsive at a preselected magnitude of error in the output voltage of the generator to apply a corrective voltage of predetermined magnitude to the field winding, the magnitude of said corrective voltage being greater than that required for correction of such error, of means including a time delay element prolonging such application beyond the time when the error in the output voltage is overcome and terminating application of such corrective voltage upon the expiration of a selected period sufficient to insure restoration of a normal relationship between generator output voltage and field excitation as a result of hysteresis relaxation following termination of the application of such corrective voltage.

4. In a regulating system for a direct current generator having a field winding for excitation of said generator, in combination, means to afford an error signal upon the occurrence of an error of predetermined magnitude in the output voltage of said generator and maintain it thereafter until the expiration of a predetermined period after said error is substantially overcome, a resistor connected in series circuit with said field winding, and means responsive to said error signal to afford across said resistor a corrective voltage of predetermined magnitude greater than that required to overcome such error.

5. The combination defined in claim 4 in which said means to afford an error signal comprises the operating winding of a relay, and in which said means responsive to said error signal comprises contacts of said relay connected in shunt circuit with at least a portion of said resistor.

6. In a voltage regulating system affording correction of residual magnetic errors in the output voltage v. field excitation characteristic of a direct current generator having a field winding for excitation thereof, in combination, means including means to afford a reference voltage to provide a signal of predetermined magnitude upon the occurrence of an error of predetermined magnitude in the output voltage of said generator and maintain it thereafter until such error is overcome, a resistor connected in series circuit with the field winding, and means responsive to such signal to afford said resistor a corrective voltage of preselected magnitude which is greater than that required to overcome such error, and means to adjust the magnitude of said corrective voltage and said reference voltage in predetermined correspondence.

7. The combination defined in claim 4 in which said means to afford a signal comprises the cathode and the control electrode of an electron tube, and in which said means responsive to said signal comprises the cathode and anode of said electron tube.

8. In a regulating system affording correction of residual magnetic errors in the output voltage v. field excitation characteristic of a direct current generator having a field winding for excitation thereof, in combination, means to afford a signal of preselected magnitude upon the occurrence of an error of predetermined magnitude in the output voltage of said generator and maintain it thereafter until expiration of a predetermined period after said error is overcome, and means in circuit with said field winding responsive to such signal to apply to said field winding a corrective voltage of a magnitude greater than that required to overcome such error.

9. The combination defined in claim 8 in which said means to afford a signal of preselected magnitude comprises means to detect error in the output voltage of said generator, and time delay means to prolong the affording of said signal for a period after said error is overcome sufficient to insure restoration of a normal relationship between the output voltage of said generator and the excitation of said field winding following cessation of the affording of such corrective voltage.

10. The combination defined in claim 8 in which said means in circuit with said field winding comprises a bridge network for energization from a unidirectional source of supply, and having said field winding connected in one branch thereof, and contacts connected in shunt circuit with a portion of said bridge whereby actuation of said contacts alters the voltage applied to said field winding.

11. In a voltage regulation system affording correction of residual magnetic errors in the output voltage v. field excitation characteristic of a direct current generator having a field winding for excitation thereof in combination, means in circuit with said generator affording a reference voltage proportional to the output voltage of said generator, means including non-linear impedance means in circuit with said generator affording a voltage variable with the impedance of said non-linear impedance means and the output voltage of said generator, means in circuit with said first and said second mentioned means to compare said voltages afforded thereby, means responsive at a preselected relative value of said voltages to apply a corrective voltage of preselected magnitude to said field winding, said magnitude being greater than that required for correction of said error, and means affording a time delay prolonging such application of said corrective voltage beyond the time when the error in the output voltage is overcome and terminating application of such corrective voltage upon the expiration of a selected period sufficient to insure restoration of a normal relationship between generator output voltage and field excitation as a result of hysteresis relaxation following termination of the application of such corrective voltage.

12. In a voltage regulating system for a direct current generator having a field winding for excitation of said generator, in combination, means to afford a reference voltage, means to measure the output voltage of said generator including means to delay response thereof to changes in such output voltage, an electron tube having a cathode and a control electrode connected in circuit with said first and second mentioned means and further having an anode, and a resistor connected across said anode and said cathode in series circuit with the field winding.

References Cited in the file of this patent

UNITED STATES PATENTS

| | | |
|---|---|---|
| 2,393,620 | Adams et al. | Jan. 29, 1946 |
| 2,504,878 | Reilly | Apr. 18, 1950 |
| 2,601,002 | Picking | June 17, 1952 |
| 2,616,072 | Edwards et al. | Oct. 28, 1952 |
| 2,675,518 | Morgan | Apr. 13, 1954 |

FOREIGN PATENTS

| | | |
|---|---|---|
| 302,019 | Germany | Nov. 27, 1917 |